US010994660B2

(12) United States Patent
Ngo

(10) Patent No.: US 10,994,660 B2
(45) Date of Patent: May 4, 2021

(54) TAILGATE ASSEMBLY WITH A STEP

(71) Applicant: Ford Global Technologies, LLC, Dearborn, MI (US)

(72) Inventor: Tom Thanh Ngo, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 268 days.

(21) Appl. No.: 16/018,422

(22) Filed: Jun. 26, 2018

(65) Prior Publication Data
US 2019/0389388 A1 Dec. 26, 2019

(51) Int. Cl.
*B60R 3/02* (2006.01)
*B62D 33/03* (2006.01)
*B62D 33/027* (2006.01)

(52) U.S. Cl.
CPC ............ *B60R 3/02* (2013.01); *B62D 33/0273* (2013.01); *B62D 33/03* (2013.01)

(58) Field of Classification Search
CPC ........ B60R 3/02; B62D 33/0273; B62D 33/03
See application file for complete search history.

(56) References Cited

U.S. PATENT DOCUMENTS

| | | | | |
|---|---|---|---|---|
| 1,363,396 A * | 12/1920 | Cross | ..................... | B61D 23/02 182/88 |
| 3,507,515 A * | 4/1970 | Brammer | .................. | B60R 3/02 280/166 |
| 3,756,622 A * | 9/1973 | Pyle | ......................... | B60R 3/02 280/166 |
| 3,865,399 A * | 2/1975 | Way | .......................... | E06C 5/00 280/166 |
| 4,108,457 A * | 8/1978 | Garrett | ...................... | B60R 3/02 105/447 |
| 4,639,032 A * | 1/1987 | Barbour | .................... | B60R 3/02 244/129.6 |
| 4,846,487 A * | 7/1989 | Criley | ....................... | B60R 3/02 280/166 |
| 5,205,603 A * | 4/1993 | Burdette, Jr. | ............. | B60R 3/02 182/195 |
| 5,549,312 A * | 8/1996 | Garvert | ..................... | B60R 3/02 280/166 |
| 5,788,311 A * | 8/1998 | Tibbals | .............. | B62D 33/0273 296/26.11 |
| 6,270,139 B1 * | 8/2001 | Simpson | ................. | B60P 1/435 296/26.01 |
| 6,422,342 B1 * | 7/2002 | Armstrong | ................ | B60R 3/02 182/127 |
| 6,685,204 B1 | 2/2004 | Hehr | | |
| 6,857,680 B2 * | 2/2005 | Fielding | ............... | B60N 2/3015 280/166 |
| 6,905,158 B1 * | 6/2005 | Bastian | ..................... | B60R 3/02 280/164.1 |

(Continued)

*Primary Examiner* — Katy M Ebner
(74) *Attorney, Agent, or Firm* — David Coppiellie, Esq.; Carlson, Gaskey & Olds, P.C.

(57) ABSTRACT

A tailgate assembly includes, among other things, a tailgate coupled to a vehicle body, and a step moveable from a stowed position where the step is held within a chamber of the tailgate to a step position where the step provides a step surface to a vehicle cargo bed. A method includes, among other things, moving a step from a stowed position where the step is held within a chamber of a tailgate to a step position where the step provides a step surface to a vehicle cargo bed.

16 Claims, 6 Drawing Sheets

(56) References Cited

U.S. PATENT DOCUMENTS

| | | | |
|---|---|---|---|
| 6,918,624 B2 * | 7/2005 | Miller | B60P 3/40 |
| | | | 182/127 |
| 6,942,272 B2 * | 9/2005 | Livingston | B60R 3/02 |
| | | | 296/57.1 |
| 6,966,597 B2 | 11/2005 | Tegtmeier | |
| 7,111,858 B2 * | 9/2006 | Manser | B60R 3/02 |
| | | | 182/127 |
| 7,168,722 B1 * | 1/2007 | Piotrowski | B60R 3/02 |
| | | | 280/166 |
| 7,232,173 B2 * | 6/2007 | Katterloher | B60R 3/02 |
| | | | 296/50 |
| 7,234,750 B1 * | 6/2007 | Doolittle | B60R 3/02 |
| | | | 296/57.1 |
| 7,261,357 B1 * | 8/2007 | Bechen | B60R 3/02 |
| | | | 296/57.1 |
| 7,401,833 B2 * | 7/2008 | Dryja | B62D 33/0273 |
| | | | 296/61 |
| 7,448,637 B2 * | 11/2008 | Parker | B60R 3/02 |
| | | | 182/88 |
| 7,673,922 B1 * | 3/2010 | Grimes | B60R 3/02 |
| | | | 296/62 |
| 7,712,811 B2 * | 5/2010 | Heaman | B62D 33/0273 |
| | | | 296/26.08 |
| 7,909,381 B2 | 3/2011 | King et al. | |
| 8,079,628 B2 * | 12/2011 | Micheli | B60P 3/423 |
| | | | 296/62 |
| 8,246,063 B1 * | 8/2012 | Rowland | B61D 23/02 |
| | | | 280/166 |
| 8,348,325 B2 * | 1/2013 | Hausler | B62D 33/0273 |
| | | | 296/51 |
| 8,444,201 B1 * | 5/2013 | Crawford | B60R 3/02 |
| | | | 296/62 |
| 8,505,944 B2 * | 8/2013 | Genest | B60R 3/02 |
| | | | 280/166 |
| 8,511,734 B2 * | 8/2013 | Hutchins, Jr. | B62D 33/0273 |
| | | | 296/61 |
| D717,713 S * | 11/2014 | Whalen | D12/317 |
| 8,919,853 B2 * | 12/2014 | Krishnan | B60R 3/02 |
| | | | 296/62 |
| 9,302,719 B1 * | 4/2016 | Krishnan | B62D 33/0273 |
| 9,463,746 B2 * | 10/2016 | Butlin, Jr. | B62D 33/0273 |
| 9,517,711 B2 * | 12/2016 | Krajenke | B60R 3/00 |
| 9,522,621 B2 * | 12/2016 | Krajenke | B60R 3/00 |
| 9,623,803 B1 * | 4/2017 | Martins | B60R 3/02 |
| 9,889,782 B2 | 2/2018 | Gobart | |
| 9,902,328 B1 * | 2/2018 | Mazur | B60R 3/02 |
| 10,005,396 B2 * | 6/2018 | Spahn | B62D 33/03 |
| 10,086,775 B2 * | 10/2018 | Spahn | B25H 1/16 |
| 10,106,087 B2 * | 10/2018 | Stojkovic | B60P 3/14 |
| 10,106,208 B2 * | 10/2018 | Barrios Albert | B60R 3/02 |
| 10,131,384 B2 * | 11/2018 | Raines | B60P 7/0876 |
| 10,183,623 B2 * | 1/2019 | Krishnan | B60R 3/02 |
| 10,246,137 B2 * | 4/2019 | Ngo | B60R 3/00 |
| 10,464,618 B2 * | 11/2019 | Loew | B62D 33/03 |
| 10,543,789 B1 * | 1/2020 | Hemphill | B62D 33/037 |
| 10,661,842 B2 * | 5/2020 | Povinelli | B62D 33/0273 |
| 2002/0070577 A1 * | 6/2002 | Pool, III | B60R 3/02 |
| | | | 296/62 |
| 2003/0075943 A1 * | 4/2003 | Kirchhoff | B62D 33/0273 |
| | | | 296/26.11 |
| 2010/0181741 A1 * | 7/2010 | Webb | B60R 3/02 |
| | | | 280/166 |
| 2017/0291551 A1 * | 10/2017 | Krajenke | B60R 3/02 |
| 2019/0389388 A1 * | 12/2019 | Ngo | B60R 3/02 |
| 2020/0109588 A1 * | 4/2020 | Nania | B62D 33/03 |

* cited by examiner

TAILGATE ASSEMBLY WITH A STEP

TECHNICAL FIELD

This disclosure relates to a tailgate assembly including a step to help move to and from a cargo bed.

BACKGROUND

A vehicle, such as a pickup truck can include a cargo bed that is used to transport various types of items. The vehicle typically includes a tailgate that encloses one end of the cargo bed. The tailgate can be pivoted from a closed position to an open position to provide access to the cargo bed. When the tailgate is in the open position, cargo can be removed from, or loaded into, the cargo bed.

The cargo bed is elevated relative to ground level. Due to the elevation of the cargo bed, it may be helpful to improve the ingress and egress.

SUMMARY

A tailgate assembly according to an exemplary aspect of the present disclosure includes, among other things, a tailgate coupled to a vehicle body, and a step moveable from a stowed position where the step is held within a chamber of the tailgate to a step position where the step provides a step surface to a vehicle cargo bed.

In another example of the foregoing tailgate assembly, each portion of tailgate is vertically displaced from each portion of the tailgate when the step is in the step position.

Another example of any of the foregoing tailgate assemblies includes a lid that covers the step when the step is in the stowed position.

In another example of any of the foregoing tailgate assemblies, the lid is moveable between a covering position where the lid covers the step within the chamber, and an open position where the lid provides a stepping surface to a vehicle cargo bed.

Another example of any of the foregoing tailgate assemblies includes an articulation assembly coupled to the tailgate at a first pivot and to the step at a second pivot.

In another example of any of the foregoing tailgate assemblies, the first pivot is vertically above the second pivot when the step is in the step position.

In another example of any of the foregoing tailgate assemblies, the articulation assembly is configured to pivot relative to the tailgate about the first pivot in a rotational direction and to pivot about the second pivot in the rotational direction to place the step in the step position.

In another example of any of the foregoing tailgate assemblies, at least one support strap couples the first pivot to the step when the step is in the step position.

In another example of any of the foregoing tailgate assemblies, the step is a lower step. A floor of the chamber provides an upper step when the lower step is in the step position.

In another example of any of the foregoing tailgate assemblies, the tailgate is pivotable back and forth between a closed position relative to a vehicle cargo bed and an open position relative to the vehicle cargo bed.

A method according to an exemplary embodiment of the present disclosure includes, among other things, moving a step from a stowed position where the step is held within a chamber of a tailgate to a step position where the step provides a step surface to a vehicle cargo bed.

In another example of the foregoing method, the moving includes sliding the step from the stowed position, and then pivoting the step downward to the step position.

Another example of any of the foregoing methods includes opening the tailgate prior to the moving.

Another example of any of the foregoing methods includes covering the step with a lid when the step is in the stowed position within the chamber.

Another example of any of the foregoing methods includes moving the lid from a covering position to an open position to access the step prior to the moving, and providing a stepping surface with the lid in the open position.

In another example of any of the foregoing methods, the step is a lower step. A floor of the chamber provides an upper step when the lower step is in the step position.

Another example of any of the foregoing methods includes linking the step to the tailgate through an articulation assembly. The articulation assembly is configured to pivot relative to the tailgate about a first pivot in a rotational direction and configured to pivot about a second pivot in the rotational direction to place the step in the step position.

In another example of any of the foregoing methods, the first pivot is vertically above the second pivot when the step is in the step position.

Another example of any of the foregoing methods including press-fitting the step within the chamber.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary assemblies and methods of providing a step surface to a vehicle cargo bed. A step can be moved to a position where the step provides the step surface. When not in use, the step can be housed within a chamber of a tailgate. These and other features are discussed in greater detail in the following paragraphs.

Figure 1:
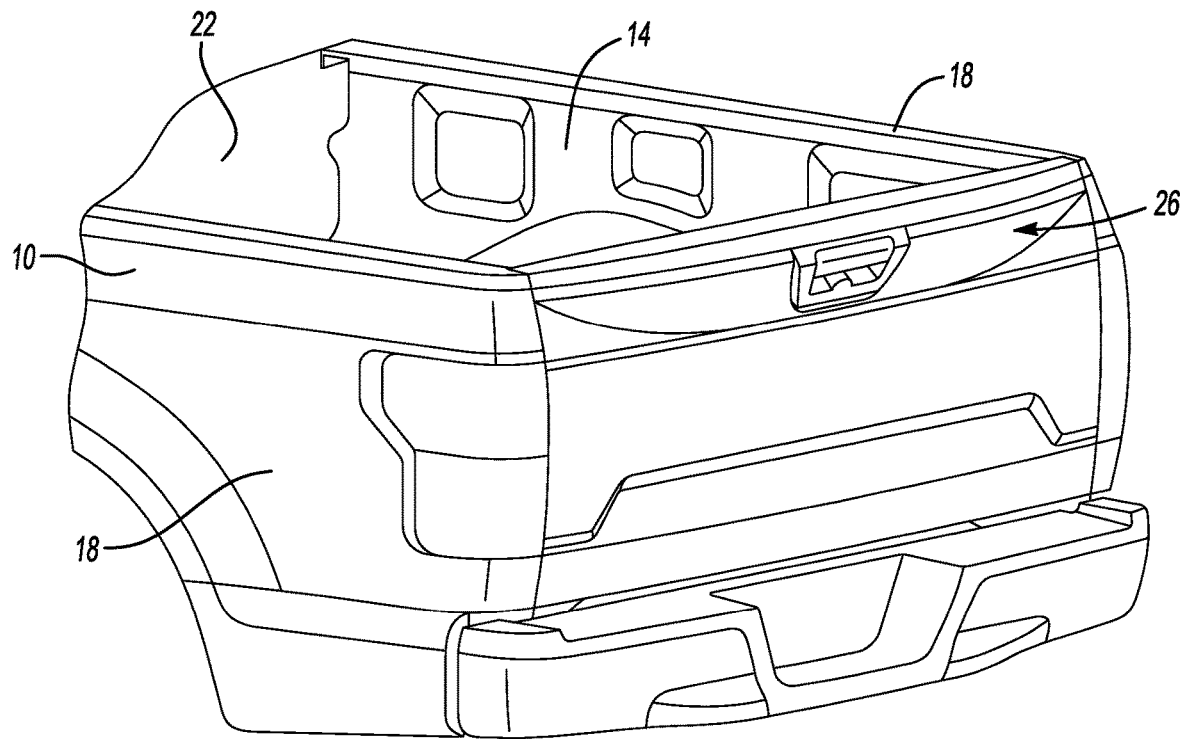
FIG. 1 illustrates a perspective view of a rear of a truck with a tailgate in a closed position.
Figure 2:
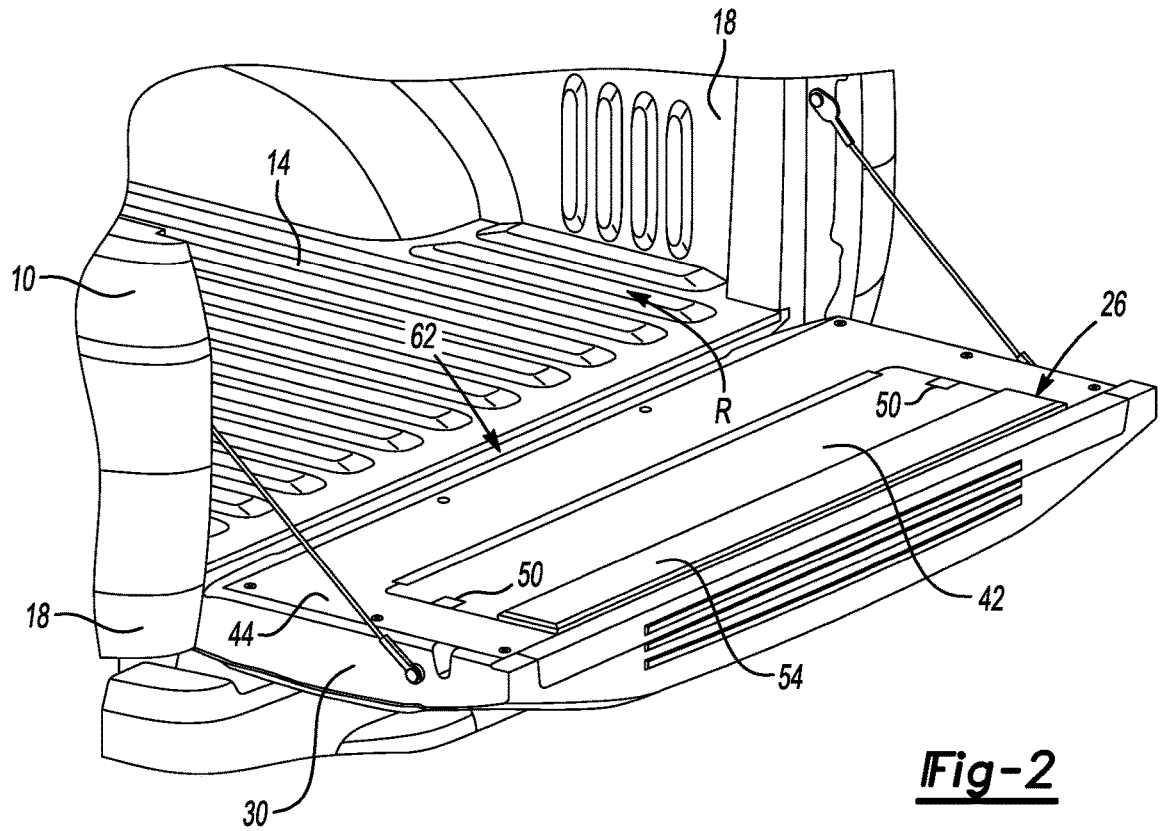
FIG. 2 illustrates the tailgate of FIG. 1 in an open position with a step in a stowed position within a chamber and covered by a lid.

FIGS. 1 and 2 illustrate a rear of a truck 10 having a cargo bed 14 that is defined between a pair of sidewalls 18, a front wall 22, and a tailgate assembly 26. The tailgate assembly 26 is pivotably coupled to a vehicle body, here a body of the truck 10. The tailgate assembly 26 is pivotable back and forth between the closed position of FIG. 1 and the open position of FIG. 2. Although described in connection with the truck 10, the tailgate assembly 26 could be used in connection with other types of vehicles incorporating a tailgate assembly.

Figure 3:
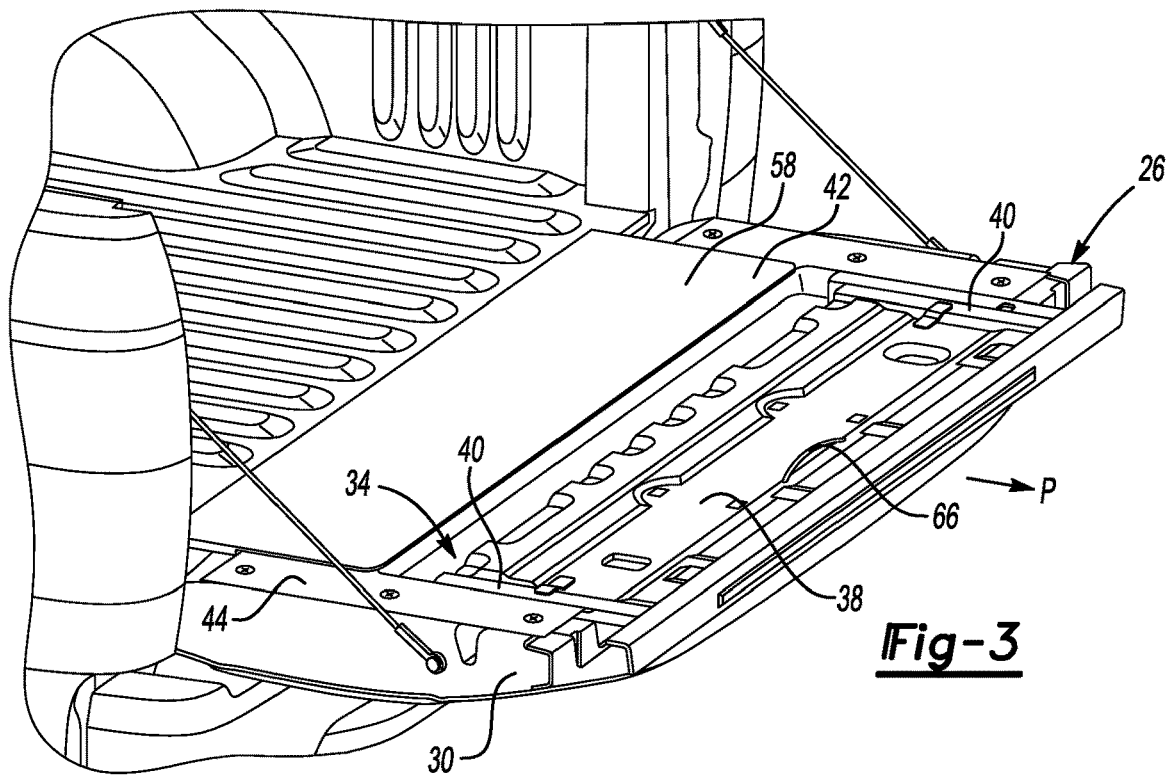
FIG. 3 illustrates the tailgate of FIG. 2 with the cover opened and the step slid rearward from the stowed position of FIG. 2.
Figure 4:
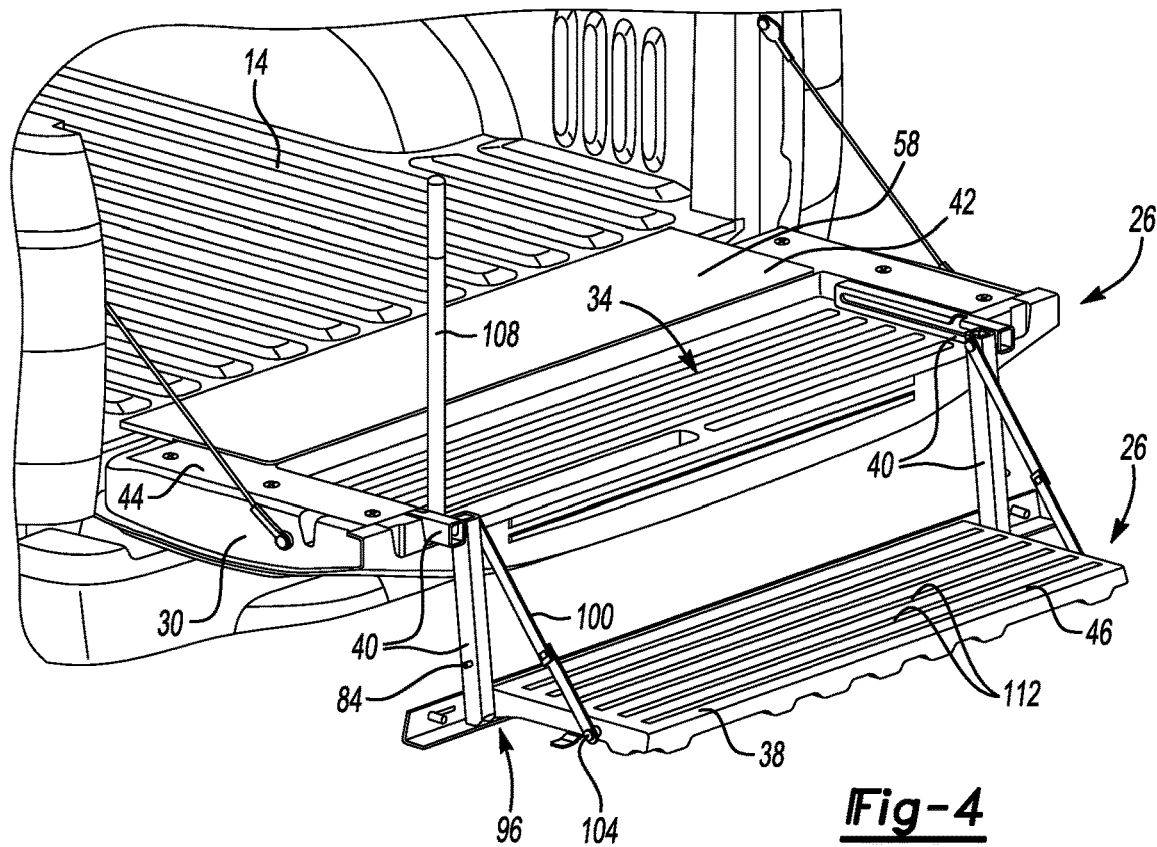
FIG. 4 illustrates the step moved from the position of FIG. 3 to a stepping position.

With reference now to FIGS. 3 and 4, and continued reference to FIG. 2, the tailgate assembly 26 includes a tailgate 30, a chamber 34, a step 38, an articulation assembly 40, a lid 42, and a trim panel 44. The tailgate 30 provides the chamber 34 in this example. When not in use, the step 38 can be in a stowed position (FIG. 2) where the step 38 is housed within the chamber 34. The lid 42 can cover the step 38 in the stowed position.

The step 38 can move from the stowed position of FIG. 2 to a step position shown in FIG. 4. When in the step position, the step 38 provides a step surface 46 to the cargo bed 14. In the step position, each portion of tailgate 30 is vertically displaced from each portion of the step 38. Vertical, for purposes of this disclosure, is with reference to ground and the ordinary orientation of the vehicle when operating or when parked.

When in the step position of FIG. 4, the step 38 provides a lower step to the cargo bed 14. The tailgate 30, a floor of the chamber 34, the lid 42, or some combination of these can provide an upper step to the cargo bed 14.

To move the step 38 from the stowed position of FIG. 2 to the step position of FIG. 4, a user can rotate the lid 42 in a direction R. This moves the lid 42 from a covering position to an open position where a user can access the step 38.

Clips 50 or another type of restraining device could be used to hold the lid 42 in the covering position. The user may need to disengage the clips 50 to permit rotation of the lid 42 to the open position of FIGS. 3 and 4. The lid 42 can include one or more reinforced or raised areas 54 or other features to strengthen the lid 42. When the lid 42 is in the open position, the user can step on an underside 58 of the lid 42 when entering and exiting the cargo bed 14. The lid 42 thus provides a stepping surface to the cargo bed 14. The raised areas 54 can block the lid 42 from deflecting under load.

The lid 42, in this example, spans at least partially across a gap 62 between the tailgate 30 and the cargo bed 14. This can help to avoid the gap 62 presenting a trip hazard to the user. Notably, the raised areas 54 are sized to be received within the gap 62, which can ensure proper alignment and help to maintain consistent areas of contact between the lid 42 and the tailgate 30, and between the lid 42 and the cargo bed 14.

The lid 42 can be a polymer or polymer-based material. The lid 42 can be hingedly connected to the trim panel 44, which can be secured to the tailgate 30 with, for example, mechanical fasteners. In some examples, the trim panel 44, the hinge, the lid 42, and the clips 50 are manufactured separately from each other. These components can then be joined together to provide a single assembly including the trim panel 44, the hinge, the lid 42, and the clips 50. That single assembly can then be secured to the tailgate 30 at a vehicle assembly plant, for example.

After the lid 42 is in the open position, the user can grasp a handle 66 that is coupled to the step 38, and then pull the handle 66 rearward in a direction P (FIG. 3) to slide the step 38 rearward relative to the cargo bed 14. In other examples, the user moves the step 38 to the position of FIG. 3 without grasping and pulling the handle 66.

The lid 42 is pivotably coupled to the tailgate 30 through the articulation assembly 40, which, in this example, includes a slide rail 70 and a pivot arm 74 on each lateral side of the step 38. The articulation assemblies 40 are pivotably connected to the step 38 and to the tailgate 30.

Figure 5:
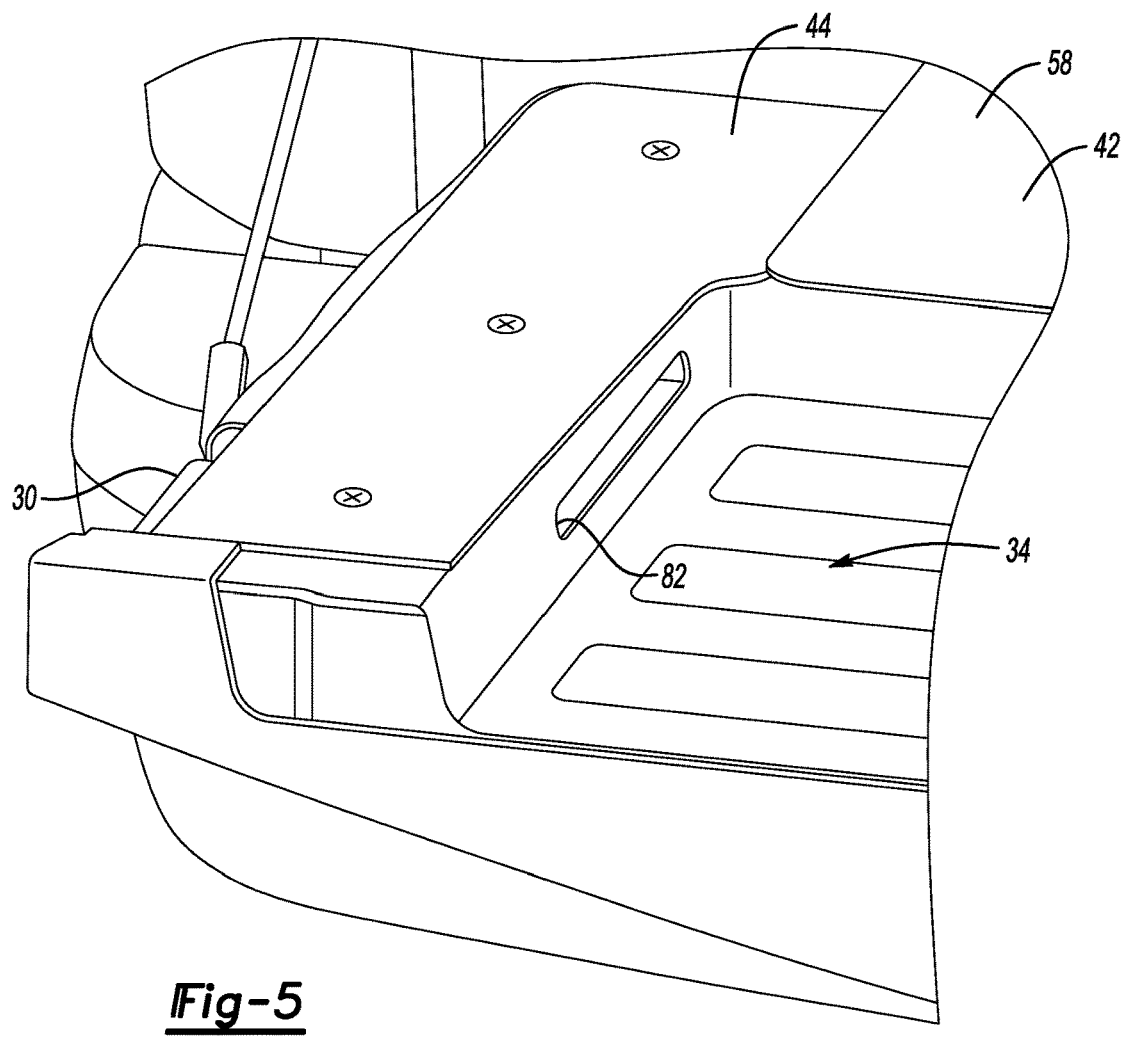
FIG. 5 illustrates a perspective view of selected portions of the tailgate in the position of FIG. 3.
Figure 6:
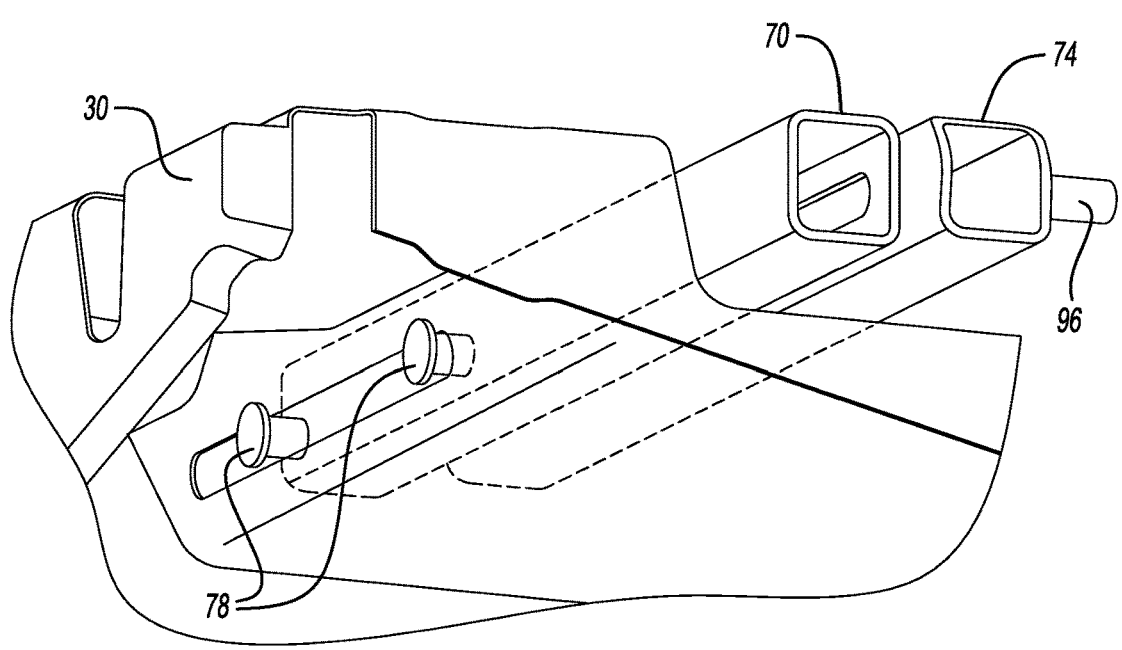
FIG. 6 illustrates a perspective view of selected portions of the tailgate, and an articulation assembly in the position of FIG. 3.

Referring to FIGS. 5 and 6, the slide rail 70 includes extensions 78, here pins, received within a slot 82 of the tailgate 30. When the user pulls the step 38 in the direction P, the slide rail 70 moves in the direction P until one of the extensions 78 contacts the rearward edge of the slots 82. Moving the slide rail 70 causes a portion of the slide rail 70 to protrude rearward of the tailgate 30 as shown in FIG. 6.

Figure 7:
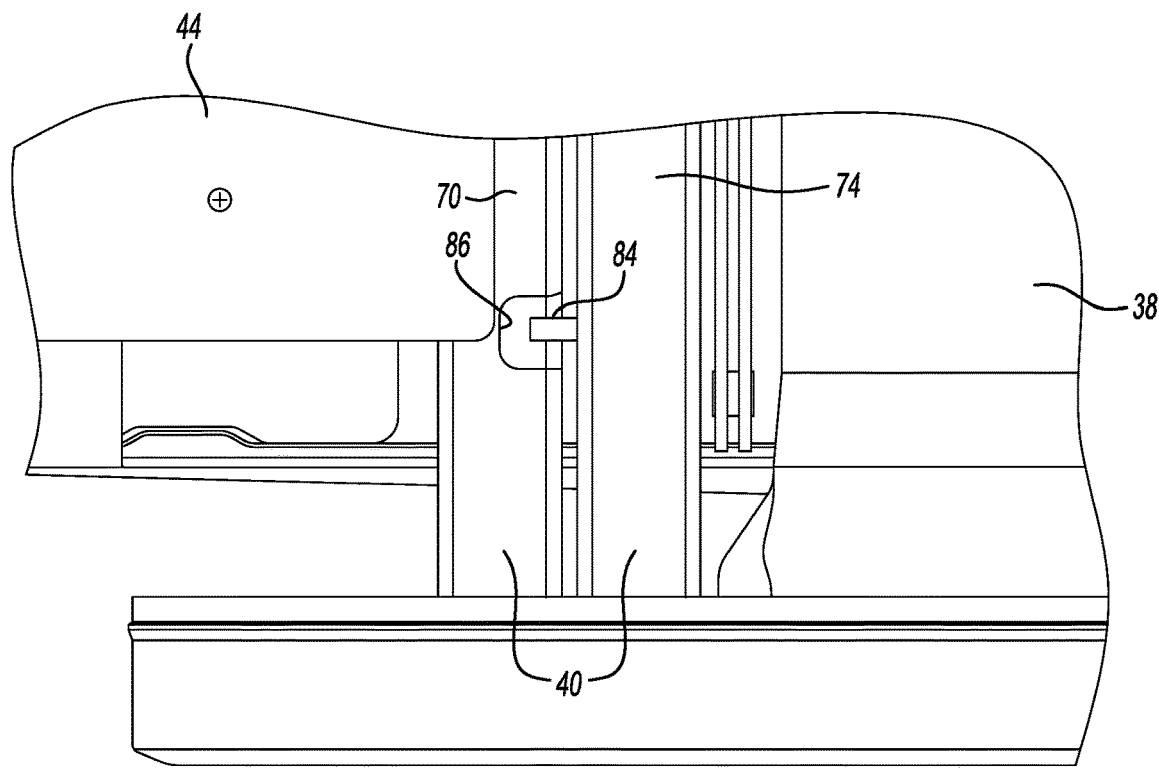
FIG. 7 illustrates a close-up view of portions of the articulation assembly coupled to the tailgate and the step when the step is lifted from the position of FIG. 3.

The step 38 can then be pulled further in the direction P to move the pivot arm 74 rearward relative to the slide rail 70 until an extension pin 84 of the pivot arm 74 is aligned with an enlarged area 86 of a groove as shown in FIG. 7. The enlarged area 86 opens upwards. In some examples, pulling the step 38 further in the direction P is not required, and the extension pin 84 is aligned within the enlarged area 86 when the extension 78 contacts the rearward edge of the slots 82.

The example extension pin 84 extends from the pivot arm 74, and the groove is within the slide rail 70. In another example, the groove is within the pivot arm 74 and the extension pin 84 extends from the pivot arm 74.

Figure 8:
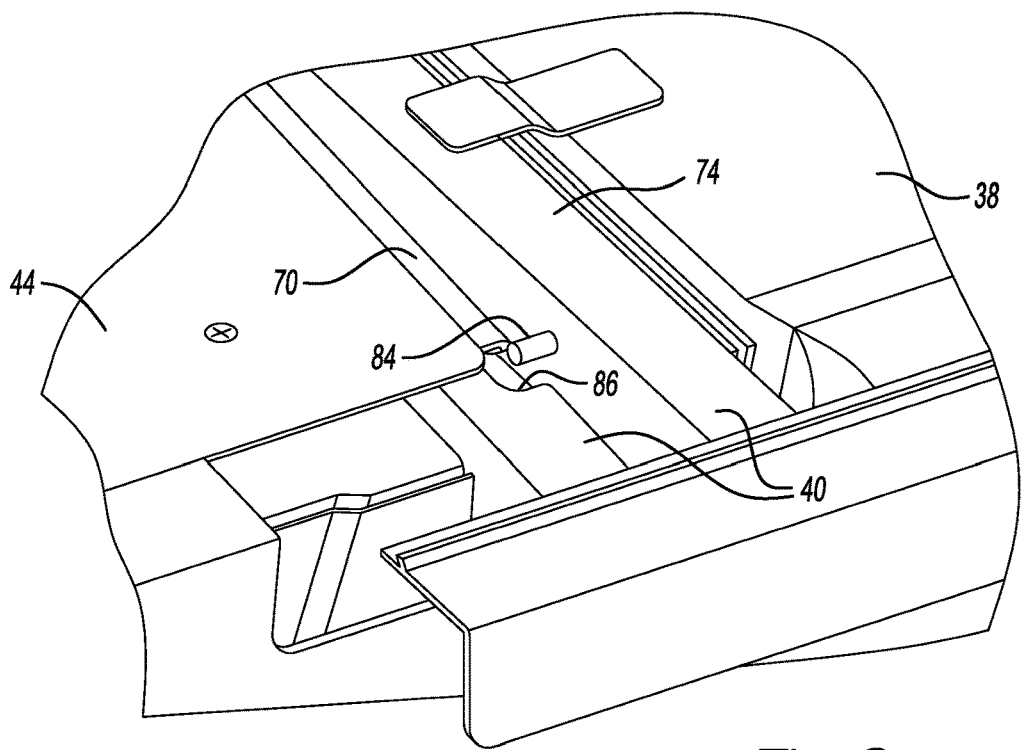
FIG. 8 illustrates a perspective view of the portion of the articulation assembly from FIG. 7.

Pulling the step 38 rearward to align the extension pin 84 with the enlarged area 86 allows the step 38 to be lifted upwards as shown in FIG. 8.

Figure 9:
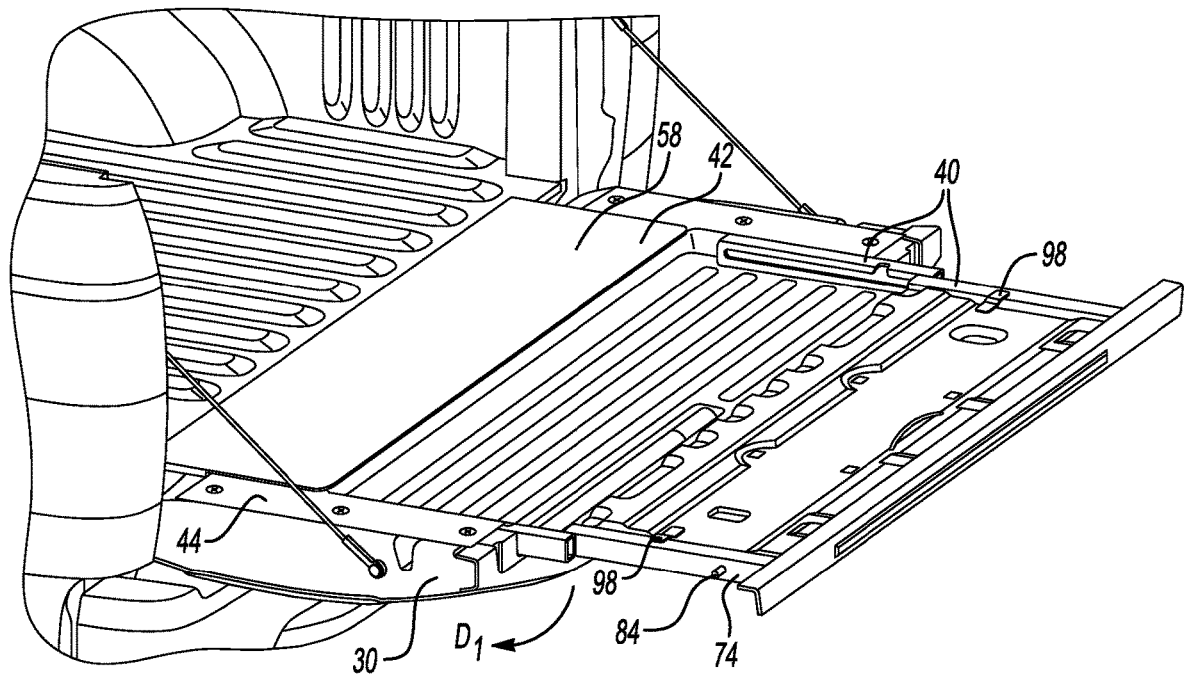
FIG. 9 illustrates the step slid further rearward from the position of FIG. 3.
Figure 10:
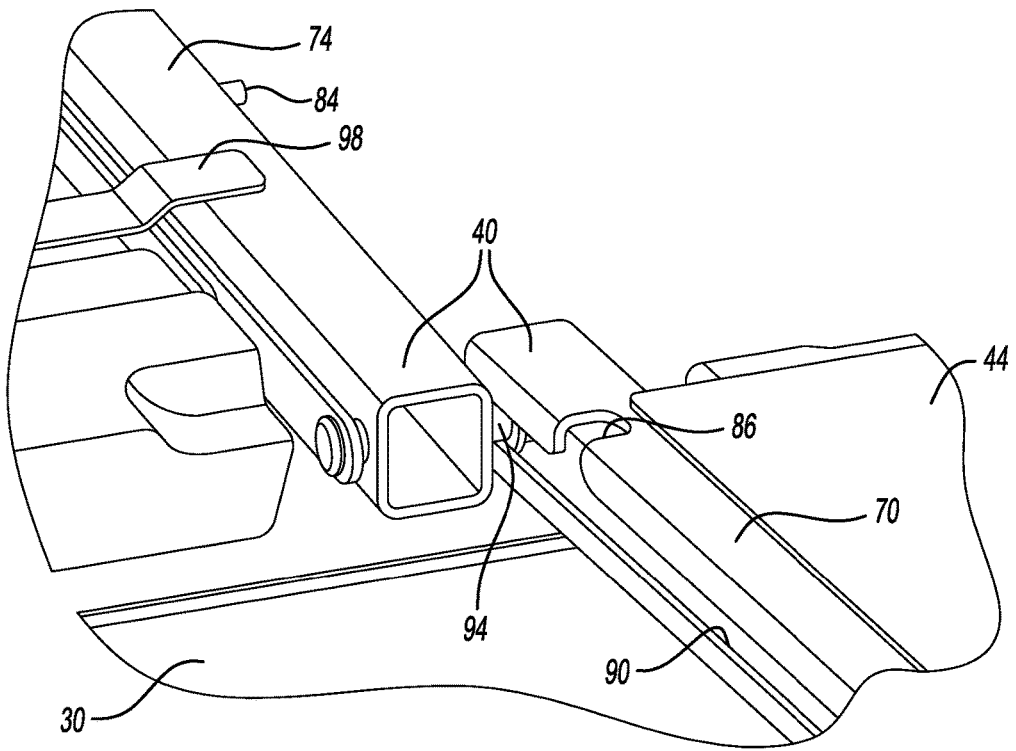
FIG. 10 illustrates a close-up rear view of a portion of the articulation assembly when the step is in the position of FIG. 9.

After tilting the step 38 upward to remove the extension pin 84 from the groove, the step 38 can then be pulled further in the direction P until reaching the position of FIGS. 9 and 10.

Notably, in this example, when the step 38 is in the stowed position, the extension pin 84 fits within a narrower, laterally facing area 90 of the groove of the slide rail 70. This laterally facing area 90 of the groove constrains movement of the extension pin 84 to inhibit the step 38 from moving relative to the tailgate 30 when the step 38 is in the stowed position. Such movement could cause undesirable noise or vibration.

When in the position of FIGS. 9 and 10, pivots 94 of the pivot arms 74 are pulled to a front area of the groove in the slide rail 70, and are within the portion of the slide rail 70 protruding rearward of the tailgate 30.

Figure 11:
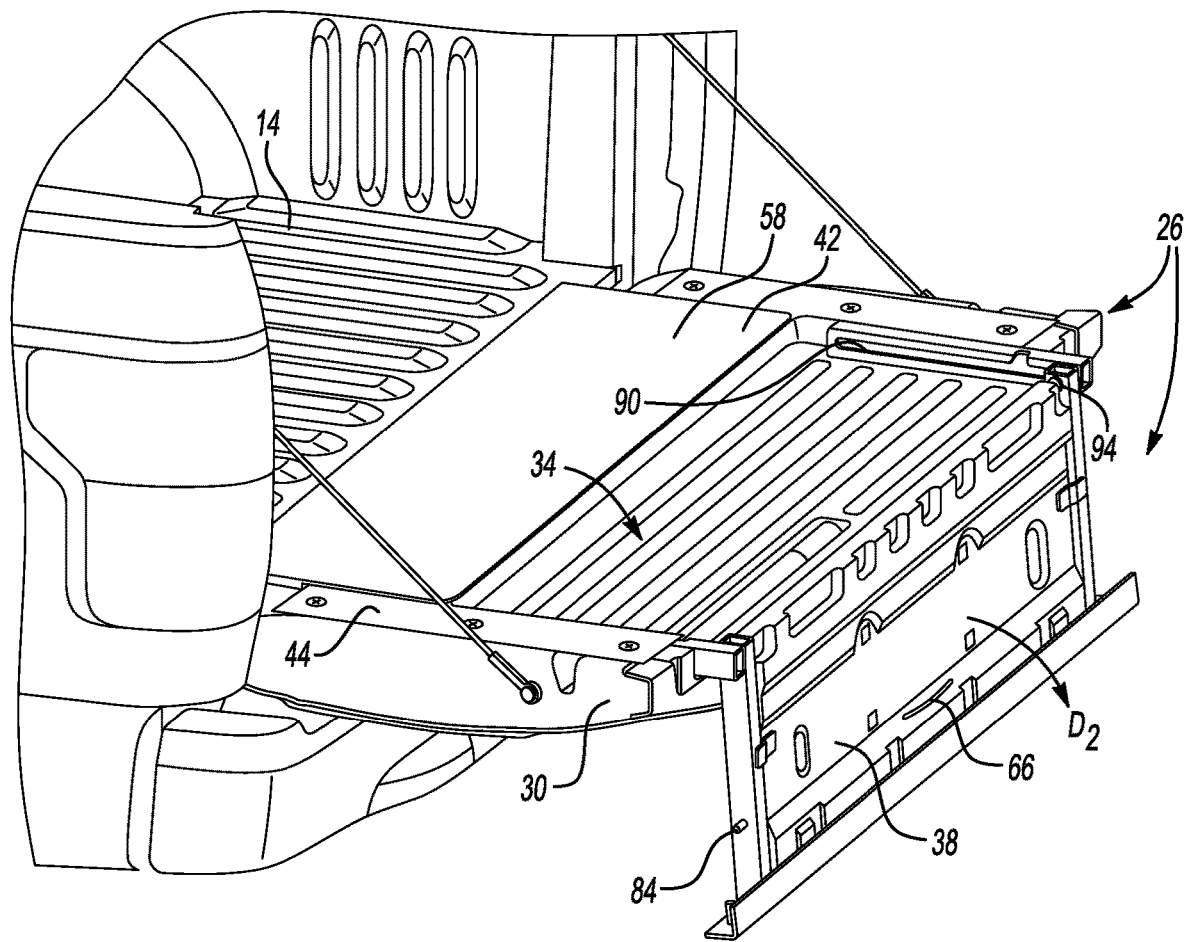
FIG. 11 illustrates the articulation assembly and step rotated downward from the position of FIG. 10.

The pivot arms 74 can then be pivoted in a direction $D_1$ about the pivots 94 from the position of FIGS. 9 and 10 to the position of FIG. 11. Next, the step 38 can be pivoted about pivots 96 in a direction $D_2$ relative to the pivot arms 74 until the step 38 is in the step position of FIG. 4. The direction $D_1$ is the same rotational direction as the direction $D_2$ in this example. Tabs 98 prevent the step 38 from pivoting relative to the pivot arms 74 before the pivot arms 74 reach the position of FIG. 11.

In this example, the pivots 94 pivotably connect the articulation assemblies 40 to the tailgate 30 as first pivots, and the pivots 96 pivotably connect the articulation assemblies 40 to the step 38 as second pivots. When the step 38 is in the step position, the first pivots are vertically above the second pivots.

Support straps 100 can then be used to couple the step 38 to another area of the articulation assembly 40. In this example, each of the support straps 100 connects a pin 104 projecting laterally from the step 38 to the pivots 94. The support straps 100 and the pivot arm 74 maintain the step 38 in the step position of FIG. 4.

When the step 38 is in the step position, the user can enter the cargo bed 14 using the step 38 as a lower step, and by using the tailgate 30, the lid 42, or both as an upper step. The user may step on a floor of the chamber 34 when using the tailgate 30 as an upper step. When in the step position, the step 38 is vertically displaced from all portions of the tailgate 30.

A grab handle 108 can be raised to provide assistance to the user entering or exiting the cargo bed 14 using the step 38. The grab handle 108 can be housed within the chamber 34 when not required.

The step 38 can be moved back to the stowed position by reversing the steps outlined above.

The step 38 can include a frame or base of a first material, such as a pressed metal or metal alloy. The step 38 can include a layer of second material, such as rubber, on the stepping surface. The other material could be formed into ridges 112. The second material and the geometry of the second material can help to provide a non-slip (or lower slip) stepping surface for the user. An upwardly facing surface of the step 38 in the step position provides the stepping surface.

The second material, in some examples, can be compressible and oversized slightly relative to the chamber 34 when outside the chamber 34. When the step 38 is in the stowed position within the chamber 34, the other material compresses against the floor of the chamber 34 to help dampen vibrations, noise, etc. That is, the step 38 can be press-fit within the chamber 34.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly, comprising:
   a tailgate coupled to a vehicle body;
   a step moveable from a stowed position where the step is held within a chamber of the tailgate to a step position where the step provides a step surface to a vehicle cargo bed,
   wherein the step is a lower step, wherein a floor of the chamber provides an upper step when the lower step is in the step position; and
   a lid that covers the step when the step is in the stowed position, wherein the lid is moveable between a covering position where the lid covers the step within the chamber, and an open position where the lid provides a stepping surface to a vehicle cargo bed.

2. The tailgate assembly of claim 1, wherein each portion of tailgate is vertically displaced from each portion of the step when the step is in the step position.

3. The tailgate assembly of claim 1, further comprising an articulation assembly coupled to the tailgate at a first pivot and to the step at a second pivot.

4. The tailgate assembly of claim 3, wherein the first pivot is vertically above the second pivot when the step is in the step position.

5. The tailgate assembly of claim 3, wherein the articulation assembly is configured to pivot relative to the tailgate about the first pivot in a rotational direction, wherein the step is configured to pivot relative to the articulation assembly about the second pivot in the rotational direction to place the step in the step position.

6. The tailgate assembly of claim 5, further comprising at least one support strap coupling the first pivot to the step when the step is in the step position.

7. The tailgate assembly of claim 1, wherein the tailgate is pivotable back and forth between a closed position relative to a vehicle cargo bed and an open position relative to the vehicle cargo bed.

8. The tailgate assembly of claim 1, wherein all portions of the step are concealed within the chamber when the step is held within the chamber in the stowed position and the lid is in the covering position.

9. A tailgate assembly, comprising:
   a tailgate pivotably coupled to a body of a vehicle;
   a step moveable from a stowed position where the step is concealed within a chamber of the tailgate to a step position where the step provides a step surface to a vehicle cargo bed;
   an articulation assembly coupled to the tailgate at a first pivot and to the step at a second pivot; and
   a lid that covers the step when the step is in the stowed position, the lid moveable between a covering position where the chamber is covered by the lid, and an open position where the chamber is uncovered by the lid,
   wherein the lid faces a cargo bed of the vehicle when the tailgate is in a tailgate closed position.

10. The tailgate assembly of claim 9, wherein the first pivot is vertically above the second pivot when the step is in the step position.

11. The tailgate assembly of claim 9, wherein the articulation assembly is configured to pivot relative to the tailgate about the first pivot in a rotational direction and to pivot about the second pivot in the rotational direction to place the step in the step position.

12. The tailgate assembly of claim 9, further comprising at least one support strap coupling the first pivot to the step when the step is in the step position.

13. The tailgate assembly of claim 9, wherein the step is a lower step, wherein a floor of the chamber provides an upper step when the lower step is in the step position.

14. A tailgate assembly, comprising:
   a tailgate coupled to a body of a vehicle; and
   a step moveable from a stowed position where the step is held within a chamber of the tailgate to a step position where the step provides a step surface to a vehicle cargo bed;
   an articulation assembly coupled to the tailgate at a first pivot and to the step at a second pivot; and
   a lid that covers the step when the step is in the stowed position within the chamber, the lid facing a cargo bed of the vehicle when the tailgate is in a tailgate closed position,
   wherein the step is a lower step, wherein a floor of the chamber provides an upper step when the lower step is in the step position.

15. The tailgate assembly of claim 14, wherein the first pivot is vertically above the second pivot when the step is in the step position.

16. The tailgate assembly of claim 14, further comprising at least one support strap coupling the first pivot to the step when the step is in the step position.

* * * * *